(12) United States Patent
Pardo et al.

(10) Patent No.: US 10,140,129 B2
(45) Date of Patent: Nov. 27, 2018

(54) PROCESSING CORE HAVING SHARED FRONT END UNIT

(71) Applicant: Intel Corporation, Santa Clara, CA (US)

(72) Inventors: Ilan Pardo, Ramat-Hasharon (IL); Dror Markovich, Tel Aviv (IL); Oren Ben-Kiki, Tel-Aviv (IL); Yuval Yosef, Hadera (IL)

(73) Assignee: Intel Corporation, Santa Clara, CA (US)

( * ) Notice: Subject to any disclaimer, the term of this patent is extended or adjusted under 35 U.S.C. 154(b) by 285 days.

(21) Appl. No.: 13/730,719

(22) Filed: Dec. 28, 2012

(65) Prior Publication Data

US 2014/0189300 A1    Jul. 3, 2014

(51) Int. Cl.
*G06F 9/38* (2018.01)
*G06F 9/30* (2018.01)

(52) U.S. Cl.
CPC ........ *G06F 9/3891* (2013.01); *G06F 9/30123* (2013.01); *G06F 9/3802* (2013.01); *G06F 9/3818* (2013.01); *G06F 9/3851* (2013.01)

(58) Field of Classification Search
CPC ........ G06F 9/30; G06F 9/3851; G06F 9/3891; G06F 9/3818; G06F 9/30123
(Continued)

(56) References Cited

U.S. PATENT DOCUMENTS 4,943,915 A    7/1990  Wilhelm et al.
4,982,402 A    1/1991  Beaven et al.
(Continued)

FOREIGN PATENT DOCUMENTS

CN    1164704 A    11/1997
CN    1608246 A    4/2005
(Continued)

OTHER PUBLICATIONS

PCT/US2013/048694 Notification of Transmittal of the International Search Report and the Written Opinion of the International Searching Authority, mailed Sep. 30, 2013, 9 pages.
(Continued)

*Primary Examiner* — Benjamin P Geib
(74) *Attorney, Agent, or Firm* — Nicholson De Vos Webster Elliott LLP

(57) ABSTRACT

A processor having one or more processing cores is described. Each of the one or more processing cores has front end logic circuitry and a plurality of processing units. The front end logic circuitry is to fetch respective instructions of threads and decode the instructions into respective micro-code and input operand and resultant addresses of the instructions. Each of the plurality of processing units is to be assigned at least one of the threads, is coupled to said front end unit, and has a respective buffer to receive and store microcode of its assigned at least one of the threads. Each of the plurality of processing units also comprises: i) at least one set of functional units corresponding to a complete instruction set offered by the processor, the at least one set of functional units to execute its respective processing unit's received microcode; ii) registers coupled to the at least one set of functional units to store operands and resultants of the received microcode; iii) data fetch circuitry to fetch input operands for the at least one functional units' execution of the received microcode.

20 Claims, 6 Drawing Sheets

(58) Field of Classification Search
USPC .......................................................... 712/30
See application file for complete search history.

(56) References Cited

U.S. PATENT DOCUMENTS

| | | | |
|---|---|---|---|
| 5,276,798 A | 1/1994 | Peaslee et al. | |
| 5,329,615 A | 7/1994 | Peaslee et al. | |
| 5,371,849 A | 12/1994 | Peaslee et al. | |
| 5,423,025 A | 6/1995 | Goldman et al. | |
| 5,430,841 A | 7/1995 | Tannenbaum et al. | |
| 5,550,988 A | 8/1996 | Sarangdhar et al. | |
| 5,649,230 A | 7/1997 | Lentz | |
| 5,890,010 A | 3/1999 | Nishigami | |
| 6,061,711 A | 5/2000 | Song et al. | |
| 6,081,849 A | 6/2000 | Born et al. | |
| 6,105,127 A * | 8/2000 | Kimura et al. | 712/215 |
| 6,148,326 A | 11/2000 | Born et al. | |
| 6,247,040 B1 | 6/2001 | Born et al. | |
| 6,275,497 B1 | 8/2001 | Varma et al. | |
| 6,331,857 B1 | 12/2001 | Hussain et al. | |
| 6,341,324 B1 | 1/2002 | Caulk, Jr. et al. | |
| 6,397,240 B1 | 5/2002 | Fernando | |
| 6,725,416 B2 | 4/2004 | Dadurian | |
| 6,742,104 B2 | 5/2004 | Chauvel et al. | |
| 6,779,085 B2 | 8/2004 | Chauvel | |
| 6,944,746 B2 | 9/2005 | So | |
| 6,952,214 B2 | 10/2005 | Naegle et al. | |
| 6,957,315 B2 | 10/2005 | Chauvel | |
| 7,065,625 B2 | 6/2006 | Alderson | |
| 7,079,147 B2 | 7/2006 | Wichman et al. | |
| 7,082,508 B2 | 7/2006 | Khan et al. | |
| 7,200,741 B1 | 4/2007 | Mine | |
| 7,209,996 B2 | 4/2007 | Kohn et al. | |
| 7,234,042 B1 * | 6/2007 | Wilson | G06F 9/30036 712/215 |
| 7,302,627 B1 | 11/2007 | Mimar | |
| 7,370,243 B1 | 5/2008 | Grohoski et al. | |
| 7,480,838 B1 | 1/2009 | Wilkerson et al. | |
| 7,545,381 B2 | 6/2009 | Huang et al. | |
| 7,583,268 B2 | 9/2009 | Huang et al. | |
| 7,598,958 B1 | 10/2009 | Kelleher | |
| 7,676,649 B2 | 3/2010 | Rapp et al. | |
| 7,746,350 B1 | 6/2010 | Danilak | |
| 7,765,388 B2 | 7/2010 | Barrett | |
| 7,793,080 B2 * | 9/2010 | Shen | G06F 9/3822 712/212 |
| 7,865,675 B2 | 1/2011 | Paver et al. | |
| 7,930,519 B2 | 4/2011 | Frank | |
| 8,020,039 B2 | 9/2011 | Reid et al. | |
| 8,055,872 B2 | 11/2011 | Biles et al. | |
| 8,063,907 B2 | 11/2011 | Lippincott | |
| 8,082,426 B2 | 12/2011 | Paltashev et al. | |
| 8,140,823 B2 | 3/2012 | Codrescu et al. | |
| 8,141,102 B2 | 3/2012 | Aho et al. | |
| 8,190,863 B2 | 5/2012 | Fossum et al. | |
| 8,212,824 B1 | 7/2012 | Allen et al. | |
| 8,230,442 B2 | 7/2012 | Aho | |
| 8,281,185 B2 | 10/2012 | Nussbaum et al. | |
| 8,345,052 B1 | 1/2013 | Diard | |
| 8,424,018 B2 | 4/2013 | Aho | |
| 8,683,175 B2 | 3/2014 | Ekanadham et al. | |
| 8,776,084 B2 | 7/2014 | Aho | |
| 8,780,123 B2 | 7/2014 | Crow et al. | |
| 8,959,311 B2 | 2/2015 | Akkar et al. | |
| 9,003,102 B2 | 4/2015 | Lassa | |
| 9,003,166 B2 | 4/2015 | Sinha et al. | |
| 9,015,443 B2 | 4/2015 | Aho | |
| 9,053,025 B2 | 6/2015 | Ben-Kiki | |
| 9,086,813 B2 | 7/2015 | Zeng et al. | |
| 9,189,261 B2 | 11/2015 | Masood | |
| 9,275,491 B2 | 3/2016 | Bolz et al. | |
| 9,361,116 B2 | 6/2016 | Ben-Kiki et al. | |
| 9,396,020 B2 | 7/2016 | Ginzburg et al. | |
| 9,417,873 B2 | 8/2016 | Ben-Kiki et al. | |
| 9,703,603 B1 | 7/2017 | Roy et al. | |
| 2001/0042210 A1 | 11/2001 | Blaker et al. | |
| 2002/0004904 A1 | 1/2002 | Blaker et al. | |
| 2002/0069327 A1 | 6/2002 | Chauvel | |
| 2002/0178349 A1 | 11/2002 | Shibayama et al. | |
| 2003/0028751 A1 | 2/2003 | McDonald et al. | |
| 2003/0093648 A1 | 5/2003 | Moyer | |
| 2003/0126416 A1 | 7/2003 | Marr et al. | |
| 2003/0135718 A1 | 7/2003 | Dewitt et al. | |
| 2003/0135719 A1 | 7/2003 | Dewitt et al. | |
| 2003/0135789 A1 | 7/2003 | Dewitt et al. | |
| 2003/0212874 A1 | 11/2003 | Alderson | |
| 2004/0055003 A1 | 3/2004 | Sundaram et al. | |
| 2004/0073836 A1 | 4/2004 | Shimada | |
| 2004/0111594 A1 | 6/2004 | Feiste et al. | |
| 2004/0160446 A1 | 8/2004 | Gosalia et al. | |
| 2004/0215444 A1 | 10/2004 | Patel et al. | |
| 2004/0227763 A1 | 11/2004 | Wichman et al. | |
| 2004/0268071 A1 | 12/2004 | Khan et al. | |
| 2005/0149937 A1 | 7/2005 | Pilkington | |
| 2005/0166038 A1 | 7/2005 | Wang et al. | |
| 2005/0257186 A1 * | 11/2005 | Zilbershlag | 716/18 |
| 2006/0050077 A1 | 3/2006 | D'Amora et al. | |
| 2006/0095721 A1 | 5/2006 | Biles et al. | |
| 2006/0095807 A1 | 5/2006 | Grochowski et al. | |
| 2006/0200802 A1 | 9/2006 | Mott et al. | |
| 2006/0288193 A1 | 12/2006 | Hsu | |
| 2007/0050594 A1 | 3/2007 | Augsburg et al. | |
| 2007/0103476 A1 | 5/2007 | Huang et al. | |
| 2007/0226464 A1 * | 9/2007 | Chaudhry et al. | 712/209 |
| 2008/0005546 A1 | 1/2008 | Wang et al. | |
| 2008/0052532 A1 | 2/2008 | Akkar et al. | |
| 2008/0104425 A1 | 5/2008 | Gunther et al. | |
| 2008/0222383 A1 | 9/2008 | Spracklen et al. | |
| 2009/0019264 A1 | 1/2009 | Correale et al. | |
| 2009/0024836 A1 * | 1/2009 | Shen et al. | 712/211 |
| 2009/0141034 A1 | 6/2009 | Pryor et al. | |
| 2009/0144519 A1 | 6/2009 | Codrescu et al. | |
| 2009/0150620 A1 | 6/2009 | Paver et al. | |
| 2009/0150722 A1 | 6/2009 | Reid et al. | |
| 2009/0198966 A1 | 8/2009 | Gschwind et al. | |
| 2009/0216958 A1 | 8/2009 | Biles et al. | |
| 2009/0254907 A1 | 10/2009 | Neary | |
| 2009/0259996 A1 | 10/2009 | Grover et al. | |
| 2009/0309884 A1 | 12/2009 | Lippincott et al. | |
| 2010/0058356 A1 | 3/2010 | Aho et al. | |
| 2010/0153686 A1 | 6/2010 | Frank | |
| 2010/0274972 A1 | 10/2010 | Babayan et al. | |
| 2010/0332901 A1 | 12/2010 | Nussbaum et al. | |
| 2011/0040924 A1 | 2/2011 | Selinger | |
| 2011/0047533 A1 | 2/2011 | Gschwind | |
| 2011/0072234 A1 | 3/2011 | Chinya et al. | |
| 2011/0093637 A1 | 4/2011 | Gupta et al. | |
| 2011/0145778 A1 * | 6/2011 | Chen | 716/136 |
| 2011/0271059 A1 | 11/2011 | Aho et al. | |
| 2012/0023314 A1 * | 1/2012 | Crum | G06F 9/3826 712/214 |
| 2012/0036339 A1 | 2/2012 | Frazier et al. | |
| 2012/0124588 A1 | 5/2012 | Sinha et al. | |
| 2012/0131309 A1 | 5/2012 | Johnson et al. | |
| 2012/0139926 A1 | 6/2012 | Clohset et al. | |
| 2012/0155777 A1 | 6/2012 | Schweiger et al. | |
| 2012/0159090 A1 | 6/2012 | Andrews et al. | |
| 2012/0166777 A1 * | 6/2012 | McLellan et al. | 712/245 |
| 2012/0239904 A1 | 9/2012 | Ekanadham et al. | |
| 2012/0311360 A1 | 12/2012 | Balasubramanian et al. | |
| 2012/0331310 A1 | 12/2012 | Burns et al. | |
| 2013/0054871 A1 | 2/2013 | Lassa | |
| 2013/0159630 A1 | 6/2013 | Lichmanov | |
| 2013/0167154 A1 | 6/2013 | Peng et al. | |
| 2013/0179884 A1 | 7/2013 | Masood | |
| 2013/0205119 A1 | 8/2013 | Rajwar et al. | |
| 2013/0332937 A1 | 12/2013 | Gaster | |
| 2014/0025822 A1 | 1/2014 | Guha et al. | |
| 2014/0176569 A1 | 6/2014 | Meixner | |
| 2014/0189317 A1 | 7/2014 | Ben-Kiki et al. | |
| 2014/0189333 A1 | 7/2014 | Ben-Kiki | |
| 2014/0282580 A1 | 9/2014 | Zeng et al. | |
| 2014/0331236 A1 | 11/2014 | Mitra et al. | |
| 2014/0344815 A1 | 11/2014 | Ginzburg et al. | |

(56) References Cited

U.S. PATENT DOCUMENTS

| | | |
|---|---|---|
| 2015/0317161 A1 | 11/2015 | Murphy |
| 2016/0246597 A1 | 8/2016 | Ben-Kiki et al. |
| 2016/0335090 A1 | 11/2016 | Weissmann et al. |
| 2016/0342419 A1 | 11/2016 | Ben-Kiki et al. |
| 2017/0017491 A1 | 1/2017 | Ben-Kiki et al. |
| 2017/0017492 A1 | 1/2017 | Ben-Kiki et al. |
| 2017/0109281 A1 | 4/2017 | Weissmann et al. |
| 2017/0109294 A1 | 4/2017 | Weissmann et al. |
| 2017/0153984 A1 | 6/2017 | Weissmann et al. |

FOREIGN PATENT DOCUMENTS

| | | |
|---|---|---|
| CN | 1981280 A | 6/2007 |
| CN | 101083525 A | 12/2007 |
| CN | 101452423 A | 6/2009 |
| CN | 101667138 A | 3/2010 |
| CN | 101855614 A | 10/2010 |
| CN | 102270166 A | 12/2011 |
| CN | 102314671 A | 1/2012 |
| CN | 102567556 A | 7/2012 |
| CN | 102741806 A | 10/2012 |
| CN | 102741826 A | 10/2012 |
| WO | 2013147887 A1 | 10/2013 |
| WO | 2014105128 A1 | 7/2014 |
| WO | 2014105152 A1 | 7/2014 |

OTHER PUBLICATIONS

PCT/US2013/048694 Notification Concerning Transmittal of International Preliminary Report on Patentability, mailed Jul. 9, 2015, 6 pages.
Office action from U.S. Appl. No. 13/730,055, mailed Jul. 27, 2015, 11 pages.
Notice of Allowance from U.S. Appl. No. 13/730,055, mailed Feb. 25, 2016, 5 pages.
Notice of Allowance from U.S. Appl. No. 13/730,055, mailed Apr. 15, 2016, 8 pages.
PCT/US2013/046166 Notification of Transmittal of the International Search Report and the Written Opinion of the International Searching Authority, mailed Sep. 2, 2013, 9 pages.
PCT/US2013/046166 Notification Concerning Transmittal of International Preliminary Report on Patentability, mailed Jul. 9, 2015, 6 pages.
Final Office Action from U.S. Appl. No. 13/729,915, mailed Dec. 2, 2015, 24 pages.
Final Office Action from U.S. Appl. No. 13/730,143, mailed May 4, 2016, 18 pages.
Final Office Action from U.S. Appl. No. 13/730,971, mailed Jul. 29, 2015, 14 pages.
IBM Technical Disclosure Bulletin NN84102905 "Multiprocessor System to Improve Context Switching," Oct. 1984, 4 pages.
International Preliminary Report on Patentability for Application No. PCT/US2013/048339, mailed Jun. 30, 2015, 6 pages.
International Preliminary Report on Patentability for International Application No. PCT/US2013/046863, mailed Jul. 9, 2015, 6 pages.
International Preliminary Report on Patentability for International Application No. PCT/US2013/046911, mailed Jul. 9, 2015, 7 pages.
International Preliminary Report on Patentability for International Application No. PCT/US2013/047387, mailed Jun. 30, 2015, 5 pages.
International Search Report and Written Opinion for Application No. PCT/US2013/046863, mailed Aug. 28, 2013, 9 pages.
International Search Report and Written Opinion for Application No. PCT/US2013/046911, mailed Sep. 27, 2013, 10 pages.
International Search Report and Written Opinion for Application No. PCT/US2013/047387, mailed Sep. 2, 2013, 9 pages.
International Search Report and Written Opinion for Application No. PCT/US2013/048339, mailed Nov. 1, 2013, 10 pages.
Jesshope C., et al., "Making Multi-cores Mainstream—from Security to Scalability," Parallel computing: From multicores and GPU's to petascale, 2010, 16 pages.
Lankamp M., "Developing a Reference Implementation for a Microgrid of Microthreaded Microprocessors," Diss. Master's thesis, University of Amsterdam, Amsterdam, the Netherlands, 2007, 57 pages.
Li E., et al., "Accelerating Video-Mining Applications Using Many Small, General-Purpose Cores," IEEE, 2008, 2 pages.
Li T., et al., "Operating system support for overlapping-ISA heterogeneous multi-core architectures," HPCA-16 2010 The Sixteenth International Symposium on High-Performance Computer Architecture. IEEE, 2010, 12 pages.
Lyons M., et al., "PowerPC storage model and AIX programming," Published: 2005, 15 pages.
Navada S.S., "A Unified View of Core Selection and Application Steering in Heterogeneous Chip Multiprocessors", Abstract, Chapters 1, 3, and 6 Jun. 15, 2012, 114 pgs.
Non-Final Office Action from U.S. Appl. No. 13/729,915, mailed Jul. 23, 2015, 22 pages.
Non-Final Office Action from U.S. Appl. No. 13/729,931, mailed Oct. 3, 2014, 13 pages.
Non-Final Office Action from U.S. Appl. No. 13/730,143, mailed Aug. 11, 2015, 13 pages.
Non-Final Office Action from U.S. Appl. No. 13/730,971, mailed Jan. 6, 2015, 13 pages.
Non-Final Office Action from U.S. Appl. No. 13/730,971, mailed Mar. 29, 2016, 15 pages.
Non-final Office Action from U.S. Appl. No. 15/145,748, mailed Oct. 3, 2016, 22 pages.
Non-Final Office Action from U.S. Appl. No. 15/226,875, mailed Oct. 4, 2016, 25 pages.
Non-Final Office Action from U.S. Appl. No. 15/281,944, mailed Nov. 25, 2016, 23 pages.
Non-Final Office Action from U.S. Appl. No. 15/282,082, mailed Nov. 28, 2016, 26 pages.
Notice of Allowance for foreign counterpart Korea Application No. 10-2015-7012995, mailed Jul. 20, 2016, 3 pages.
Notice of Allowance for foreign counterpart Korean Application No. 10-2015-7012861, mailed Mar. 29, 2016, 3 pages.
Notice of Allowance from U.S. Appl. No. 13/729,915, mailed Feb. 17, 2016, 10 pages.
Notice of Allowance from U.S. Appl. No. 13/729,931, mailed Feb. 2, 2015, 5 pages.
Notice of Allowance from U.S. Appl. No. 13/730,971, mailed Oct. 7, 2016, 17 pages.
Notice of Preliminary Rejection for foreign counterpart Korean Application No. 10-2015-7012995, mailed Feb. 22, 2016, 12 pages.
Office action for foreign counterpart Korean Application No. 10-2015-7012861, mailed Dec. 11, 2015, 5 pages.
Office Action from Foreign Counterpart Chinese Patent Application No. 201380059874.8, mailed Sep. 5, 2016, 17 pages.
Office Action from foreign counterpart Korean Patent Application No. 1020167029367, mailed Oct. 27, 2016, 6 pages.
Raphael Poss et al., "Apple-CORE: Microgrids of SVP cores Flexible, general-purpose, fine-grained hardware concurrency management," Published: Sep. 5, 2012. 8 pgs.
Sykora J., et al., "Microthreading as a Novel Method for Close Coupling of Custom Hardware Accelerators to SVP Processors," Published: 2011, 8 pgs.
Taylor I.L., "64-bit PowerPC ELF Application Binary Interface Supplement 1.9", Chapters 1 and 3-3.2.5 Published: 2004.
Thiago Madeira's blog, Architectures and ABIs detailed , Published: Jan. 2012, 15 pages.
Unifying Software and Hardware of Multithreaded Reconfigurable Applications Within Operating System Processes by Miljan Vuletic pp. i, iii, vii-ix, 1-44, 61-99, and 125-136 Published: 2006.
Vo H., "Hardware Support for Irregular Control Flow in Vector Processor," Published: May 7, 2012, 10 pages.
Choi J., et al., "Impact of Cache Architecture and Interface on Performance and Area of FPGA-Based Processor/Parallel-Accelerator Systems," IEEE 20th International Symposium on Field-Programmable Custom Computing Machines, 2012, pp. 17-24.

(56) References Cited

OTHER PUBLICATIONS

Decision to Grant a Patent from foreign counterpart Korean Patent Application No. 10-2016-7029367, dated Apr. 26, 2017, 4 pages.
Final Office Action from U.S. Appl. No. 13/730,143, dated Aug. 7, 2017, 16 pages.
Final Office Action from U.S. Appl. No. 15/145,748, dated Mar. 29, 2017, 41 pages.
Final Office Action from U.S. Appl. No. 15/226,875, dated May 17, 2017, 36 pages.
Final Office Action from U.S. Appl. No. 15/281,944, dated May 10, 2017, 42 pages.
Final Office Action from U.S. Appl. No. 15/282,082, dated Apr. 24, 2017, 38 pages.
Grant of Patent from foreign counterpart Korean Patent Application No. 10-2016-7029366, dated Jul. 31, 2017, 4 pages.
Gschwind M., "Optimizing Data Sharing and Address Translation for the Cell BE Heterogeneous Chip Multiprocessor," IEEE, 2008, pp. 478-485.
Intel 915G/915GV/91 OGL Express Chipset Graphics and Memory Controller Hub (GMCH)—White Paper' Sep. 2004 by Intel, 9 pages.
Non-Final Office Action from U.S. Appl. No. 13/730,143, dated Apr. 17, 2017, 36 pages.
Non-Final Office Action from U.S. Appl. No. 15/282,082 dated Aug. 2, 2017, 32 pages.
Notice of Allowance from U.S. Appl. No. 13/730,971, dated Jul. 28, 2017, 21 pages.
Notice of Preliminary Rejection from foreign counterpart Korean Patent Application No. KR1020167029366, dated Jan. 19, 2017, 13 pages.
Office Action from foreign counterpart China Patent Application No. 201380059874.8, dated May 16, 2017, 3 pages.
Office Action from foreign counterpart Chinese Patent Application No. 201380059888, dated Feb. 7, 2017, 18 pages.
First Office Action and Search Report from foreign counterpart China Patent Application No. 201380059899.8, dated Sep. 1, 2017, 10 pages.
First Office Action and Search Report from foreign counterpart Chinese Patent Application No. 201380059921.9, dated Sep. 20, 2017, 10 pages. (Translation available only for office action).
Non-final Office Action from U.S. Appl. No. 15/145,748, dated Sep. 22, 2017, 30 pages.
Non-Final Office Action from U.S. Appl. No. 15/226,875, dated Sep. 12, 2017, 19 pages.
Notice on Grant of Patent Right for Invention from foreign counterpart Chinese Patent Application No. 201380059874.8, dated Sep. 12, 2017, 4 pages.
Notice of Allowance from U.S. Appl. No. 15/281,944, dated Dec. 8, 2017, 28 pages.
Notice of Allowance from U.S. Appl. No. 15/282,082, dated Dec. 20, 2017, 14 pages.
Second Office Action from foreign counterpart Chinese Patent Application No. 201380059888, dated Oct. 16, 2017, 15 pages.
Second Office Action from foreign counterpart Chinese Patent Application No. 201380059921.9, dated Mar. 20, 2018, 7 pages.
First Office Action and Search Report from foreign counterpart Chinese Patent Application No. 201611088838.6, dated Apr. 28, 2018, 24 pages.
Notice of Allowance from U.S. Appl. No. 15/145,748, dated Jun. 6, 2018, 15 pages.
Notice of Allowance from U.S. Appl. No. 13/730,971, dated Mar. 27, 2018, 27 pages.
Notice of Allowance from U.S. Appl. No. 15/145,748, dated Mar. 12, 2018, 14 pages.
Notice of Allowance from U.S. Appl. No. 15/281,944, dated Mar. 26, 2018, 18 pages.
Notice of Allowance from U.S. Appl. No. 15/282,082, dated Mar. 30, 2018, 14 pages.
Notice on Grant of Patent Right for Invention from foreign counterpart Chinese Patent Application No. 201380059899.8, dated May 4, 2018, 4 pages.
Request for Amendment from foreign counterpart Korean Patent Application No. KR1020157012861, dated May 27, 2015, 5 pages.
Abandonment from U.S. Appl. No. 13/730,143, dated Apr. 24, 2018, 3 pages.
Corrected Notice of Allowability from U.S. Appl. No. 15/145,748, dated Jul. 11, 2018, 9 pages.
Final Office Action from U.S. Appl. No. 15/226,875, dated Jun. 29, 2018, 26 pages.
Notice of Allowance from U.S. Appl. No. 15/281,944, dated Jun. 27, 2018, 9 pages.
Third Office Action from foreign counterpart Chinese Patent Application No. 201380059888.0, dated Jul. 3, 2018, 17 pages.

\* cited by examiner

PROCESSING CORE HAVING SHARED FRONT END UNIT

FIELD OF INVENTION

The field of invention pertains to the computing sciences generally, and, more specifically, to a processing core having a shared front end unit.

BACKGROUND

FIG. 1 shows the architecture of an exemplary multi-core processor 100. As observed in FIG. 1, the processor includes: 1) multiple processing cores 101_1 to 101_N; 2) an interconnection network 102; 3) a last level caching system 103; 4) a memory controller 104 and an I/O hub 105. Each of the processing cores contain one or more instruction execution pipelines for executing program code instructions. The interconnect network 102 serves to interconnect each of the cores 101_1 to 101_N to each other as well as the other components 103, 104, 105. The last level caching system 103 serves as a last layer of cache in the processor before instructions and/or data are evicted to system memory 108.

The memory controller 104 reads/writes data and instructions from/to system memory 108. The I/O hub 105 manages communication between the processor and "I/O" devices (e.g., non volatile storage devices and/or network interfaces). Port 106 stems from the interconnection network 102 to link multiple processors so that systems having more than N cores can be realized. Graphics processor 107 performs graphics computations. Power management circuitry (not shown) manages the performance and power states of the processor as a whole ("package level") as well as aspects of the performance and power states of the individual units within the processor such as the individual cores 101_1 to 101_N, graphics processor 107, etc. Other functional blocks of significance (e.g., phase locked loop (PLL) circuitry) are not depicted in FIG. 1 for convenience.

FIG. 2 shows an exemplary embodiment 200 of one of the processing cores of FIG. 1. As observed in FIG. 2, each core includes two instruction execution pipelines 250, 260. Each instruction execution pipeline 250, 260 includes its own respective: i) instruction fetch stage 201; ii) data fetch stage 202; iii) instruction execution stage 203; and, iv) write back stage 204. The instruction fetch stage 201 fetches "next" instructions in an instruction sequence from a cache, or, system memory (if the desired instructions are not within the cache). Instructions typically specify operand data and an operation to be performed on the operand data. The data fetch stage 202 fetches the operand data from local operand register space, a data cache or system memory. The instruction execution stage 203 contains a set of functional units, any one of which is called upon to perform the particular operation called out by any one instruction on the operand data that is specified by the instruction and fetched by the data fetch stage 202. The write back stage 204 "commits" the result of the execution, typically by writing the result into local register space coupled to the respective pipeline.

In order to avoid the unnecessary delay of an instruction that does not have any dependencies on earlier "in flight" instructions, many modern instruction execution pipelines have enhanced data fetch and write back stages to effect "out-of-order" execution. Here, the respective data fetch stage 202 of pipelines 250, 260 is enhanced to include data dependency logic 205 to recognize when an instruction does not have a dependency on an earlier in flight instruction, and, permit its issuance to the instruction execution stage 203 "ahead of", e.g., an earlier instruction whose data has not yet been fetched.

Moreover, the write-back stage 204 is enhanced to include a re-order buffer 206 that re-orders the results of out-of-order executed instructions into their correct order, and, delays their retirement to the physical register file until a correctly ordered consecutive sequence of instruction execution results have retired.

The enhanced instruction execution pipeline is also observed to include instruction speculation logic 207 within the instruction fetch stage 201. The speculation logic 207 guesses at what conditional branch direction or jump the instruction sequence will take and begins to fetch the instruction sequence that flows from that direction or jump. The speculative instructions are then processed by the remaining stages of the execution pipeline.

FIGURES

The present invention is illustrated by way of example and not limitation in the figures of the accompanying drawings, in which like references indicate similar elements and in which.

DETAILED DESCRIPTION

Figure 1:
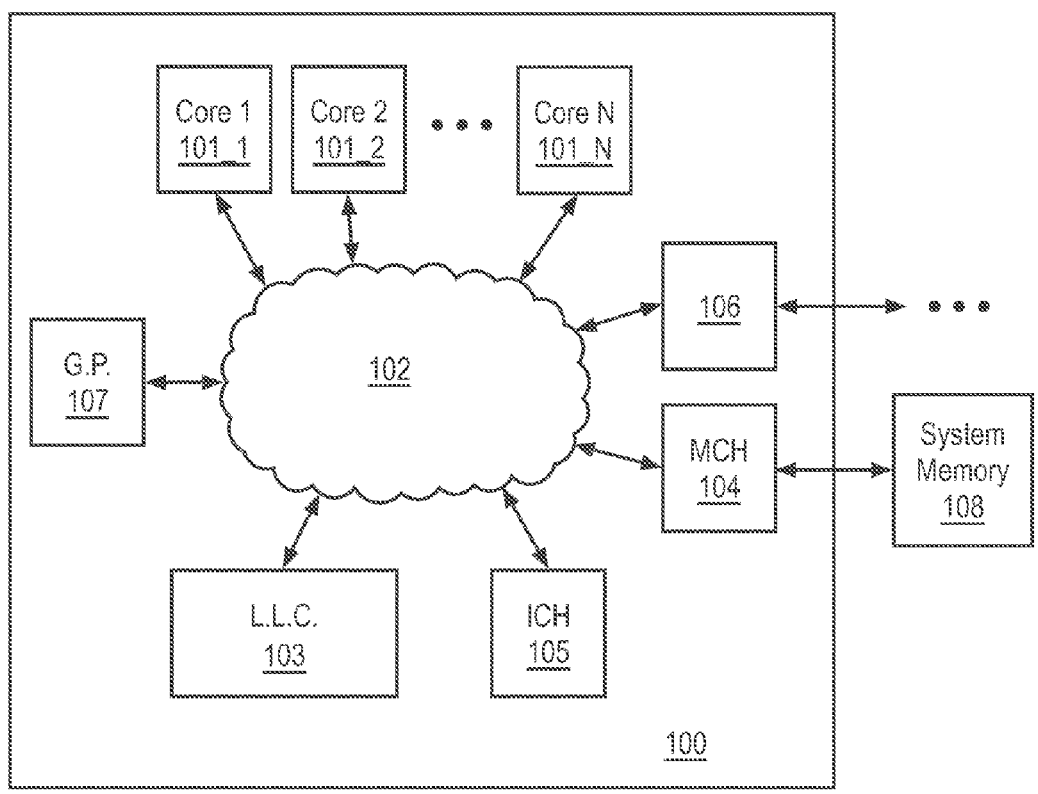
FIG. 1 shows a processor (prior art)
Figure 2:
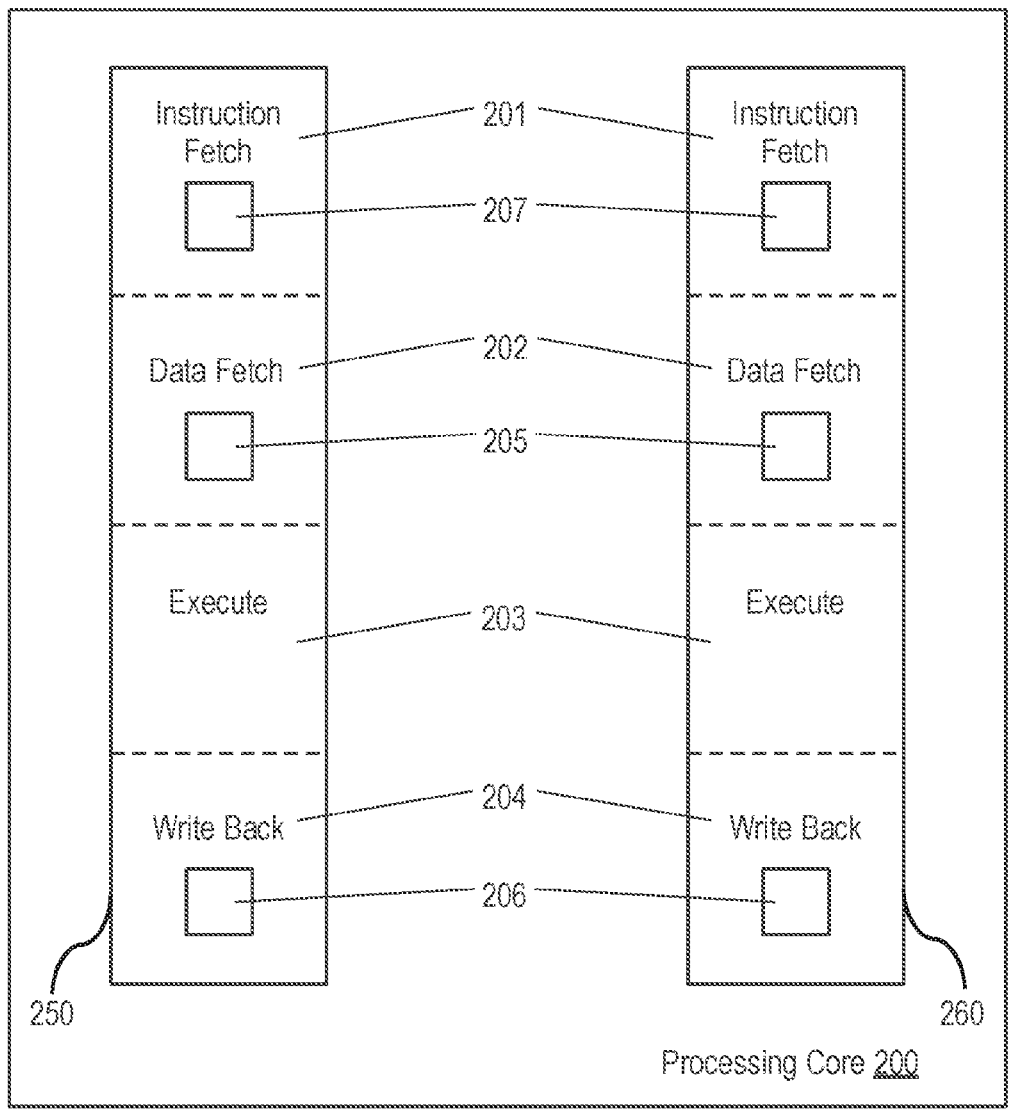
FIG. 2 shows an instruction execution pipeline (prior art)

The number of logic transistors manufactured on a semiconductor chip can be viewed as the semiconductor chip's fixed resource for processing information. A characteristic of the processor and processing core architecture discussed above with respect to FIGS. 1 and 2 is that an emphasis is placed on reducing the latency of the instructions that are processed by the processor. Said another way, the fixed resources of the processor design of FIGS. 1 and 2, such as the out-of-order execution enhancements made to each of the pipelines, have been devoted to running a thread through the pipeline with minimal delay.

The dedication of logic circuitry to the speed-up of a currently active threads is achieved, however, at the expense of the total number of threads that the processor can simultaneously process at any instant of time. Said another way, if the logic circuitry units of a processor were emphasized differently, the processor might be able to simultaneously process more threads than the processor of FIG. 1 whose processing core are designed according to the architecture of 2. For example, if the logic circuitry resources of the out-of-order execution enhancements were removed, the "freed up" logic circuitry could be re-utilized to instantiate more execution units within the processor. With more execution units, the processor could simultaneously execute more instructions and therefore more threads.

Figure 3:
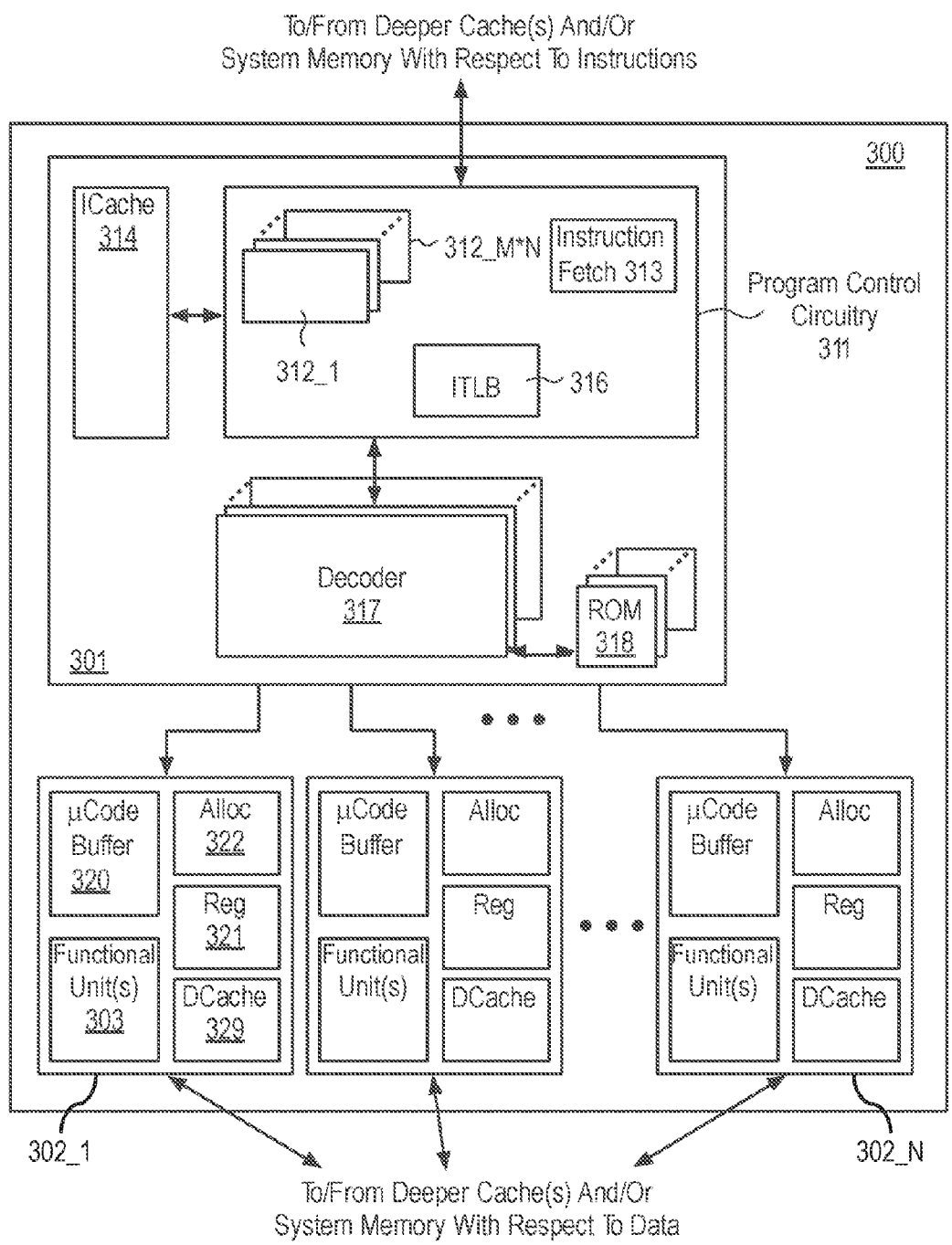
FIG. 3 shows a processing core having a shared front end unit.

FIG. 3 shows an embodiment of an e architecture of a processing core 300 that can be instantiated multiple times (e.g., once for each processing core) within a multi-core processor. The processing core architecture of FIG. 3 is designed with more execution units than is typical for a standard processing core so as to increase the overall throughput of the processing core (i.e., increase the number of threads that the processing core can simultaneously process). As observed in FIG. 3, the processing core architecture includes a shared front end unit 301 coupled to a plurality of processing units 302_1 to 302_N. Each of the processing units 302_1 to 302_N, in an embodiment, contain at least one set of functional units (e.g., at least one set of functional units 303) capable of supporting an entire instruction set, such as an entire x86 instruction set or other general purpose instruction set (as opposed to a more limited specific purpose instruction set such as the typical instruction set of a digital signal processor (DSP) or accelerator).

As observed in FIG. 3, the shared front end unit 301 fetches and receives the instructions to be processed by the processing core 300, decodes the received instructions, and dispatches the decoded instructions to their appropriate processing unit. In an embodiment, the shared front end unit fetches all instructions for all of the threads being executed by all of the general purpose processing units of the processing core.

A particular thread is assigned to a particular processing unit, and, each processing unit, as described in more detail below, is multi-threaded (i.e., can simultaneously and/or concurrently process more than one thread). Thus, if each processing unit can simultaneously/concurrently execute up to M hardware threads and there are N processing units, the processing core can simultaneously/concurrently execute up to M*N hardware threads. Here, the product M*N may be greater than the typical number of hardware threads that can simultaneously executed in a typical processing core (e.g., greater than 8 or 16 at current densities).

Referring to the shared front end unit 301, the shared front end unit contains program control logic circuitry 311 to identify and fetch appropriate "next" instructions for each thread. Here, the program control logic circuitry 311 includes an instruction pointer 312_1 to 312_M*N for each thread and instruction fetch circuitry 313. Note that FIG. 3 indicates that there are M*N instruction pointers to reflect support for M*N different hardware threads. For each hardware thread, the instruction fetch circuitry 313 first looks first to an instruction cache 314 for the instruction identified within the thread's instruction pointer. If the sought for instruction is not found within the instruction cache 314 it is fetched from program memory 315. In various implementations, blocks of instructions may be stored and fetched from cache and/or memory on a per hardware thread basis.

The individual hardware threads may be serviced by the instruction fetch circuitry 313 on a time-sliced basis (e.g., a fair round robin approach). Further still, the instruction fetch circuitry 313 may be parallelized into similar/same blocks that fetch instructions for different hardware threads in parallel (e.g., each parallel block of instruction fetch circuitry services a different subset of instruction pointers).

Because, however, the individual hardware threads may be processed slower than a traditional processor (e.g., because per thread latency reduction circuitry has not been instantiated in favor of more processing units as described above), it is conceivable that some implementations may not require parallel instruction fetch capability, or, at least include less than N parallel instruction fetch channels (e.g., N/2 parallel instruction fetch blocks). Accordingly, in any of these cases, certain components of the front end unit 301 are shared by at least two of the processing units 302_1 to 302_N.

In a further embodiment, the program control logic circuitry 311 also includes an instruction translation look-aside buffer (ITLB) circuit 316 for each hardware thread. As is understood in the art, an ITLB translates the instruction addresses received from program memory 315 into actual addresses in physical memory where the instructions actually reside.

After an instruction has been fetched it is decoded by an instruction decoder 317. In an embodiment there is an instruction decoder for each processing unit (i.e., there are N decoders). Again, e.g., where the number of processing units N has been increased at the expense of executing threads with lower latency, there may be more than one processing unit per instruction decoder. Conceivably there may even be one decoder for all the processing units.

An instruction typically specifies: i) an operation to be performed in the form of an "opcode"; ii) the location where the input operands for the operation can be found (register and/or memory space); and, iii) the location where the resultant of the operation is to be stored (register and/or memory space). In an embodiment, the instruction decoder 317 decodes an instruction not only by breaking the instruction down into its opcode and input operand/resultant storage locations, but also, converting the opcode into a sequence of micro-instructions.

As is understood in the art, micro-instructions are akin to a small software program (microcode) that an execution unit will execute in order to perform the functionality of an instruction. Thus, an instruction opcode is converted to the microcode that corresponds to the functional operation of the instruction. Typically, the opcode is entered as a look-up parameter into a circuit 318 configured to behave like a look-up table (e.g., a read only memory (ROM) configured as a look-up table). The look-up table circuit 318 responds to the input opcode with the microcode for the opcode's instruction. Thus, in an embodiment, there is a ROM for each processing unit in the processing core (or, again, there is more than one processing unit per micro-code ROM because the per-thread latency of the processing units has been diluted compared to a traditional processor).

The microcode for a decoded instruction is then dispatched along with the decoded instruction's register/memory addresses of its input operands and resultants to the processing unit that has been assigned to the hardware thread that the decoded instruction is a component of. Note that the respective micro-code for two different instructions of two different hardware threads running on two different processing units may be simultaneously dispatched to their respective processing units.

In an embodiment, as discussed above, each processing unit 302_1 to 302_N can simultaneously and/or concurrently execute more than one hardware thread. For instance, each processing unit may have X sets of execution units (where X=1 or greater), where, each set of execution units is capable of supporting an entire instruction set such as an entire x86 instruction set. Alternatively or in combination, each processing unit can concurrently (as opposed to simultaneously) execute multiple software threads. Here, concurrent execution, as opposed to simultaneous execution, corresponds to the execution of multiple software threads within a period of time by alternating processing resources amongst the software threads supported by the processing unit (e.g., servicing each of the software threads in an round robin fashion resources). Thus, in an embodiment, over a window of time, a single processing unit may concurrently execute multiple software threads by switching the software threads and their associated state information in/out of the processing unit as hardware threads of the processing unit.

As observed in FIG. 3, each processing unit has a microcode buffer 320 to store the microcode that has been dispatched from the instruction decoder 317. The microcode buffer 320 may be partitioned so that separate FIFO queuing space exists for each hardware thread supported by the processing unit. The input operand and resultant addresses are also queued in an aligned fashion or otherwise associated with the respective microcode of their instruction.

Each processing unit includes register space 321 coupled to its internal functional unit set(s) 303 for keeping the operand/resultant data of the thread(s) the functional unit set(s) 303 are responsible for executing. If a single functional unit set is to concurrently execute multiple hardware threads, the register space 321 for the functional unit set 303 may be partitioned such that there is one register set partition for each hardware thread the functional unit set 303 is to concurrently execute. As such, the functional unit set 303 "operates out of" a specific register partition for each unique hardware thread that the functional unit set is concurrently executing.

As observed in FIG. 3, each processing unit 302_1 to 302_N includes register allocation logic 322 to allocate registers for the instructions of each of the respective hardware threads that the processing unit is concurrently and/or simultaneously executing. Here, for implementations having more than one functional unit set per processing unit, there may be multiple instances of micro-code buffer circuitry 320 and register allocation circuitry 322 (e.g., one instance for each functional unit set of the processing unit), or, there may be one micro-code buffer and register allocation circuit that feeds more than one functional unit set (i.e., one micro-code buffer 320 and register allocation circuit 322 for two or more functional unit sets). The register allocation logic circuitry 322 includes data fetch logic to fetch operands (that are called out by the instructions) from register space 321 associated with the functional unit that the operands' respective instructions are targeted to. The data fetch logic circuitry may be coupled to system memory 323 to fetch data operands from system memory 323 explicitly.

In an embodiment, each functional unit set 303 includes: i) an integer functional unit cluster that contains functional units for executing integer mathematical/logic instructions; ii) a floating point functional unit cluster containing functional units for executing floating point mathematical/logic instructions; iii) a SIMD functional unit cluster that contains functional units for executing SIMD mathematical/logic instructions; and, iv) a memory access functional unit cluster containing functional units for performing data memory accesses (for integer and/or floating point and/or SIMD operands and/or results). The memory access functional unit cluster may contain one or more data TLBs to perform virtual to physical address translation for its respective threads.

Micro-code for a particular instruction issues from its respective microcode buffer 320 to the appropriate functional unit along with the operand data that was fetched for the instruction by the fetch circuitry associated with the register allocation logic 322. Results of the execution of the functional units are written back to the register space 321 associated with the execution units.

In a further embodiment, each processing unit contains a data cache 329 that is coupled to the functional units of the memory access cluster. The functional units of the memory access cluster are also coupled to system memory 323 so that they can fetch data from memory. Notably, each register file partition described above may be further partitioned into separate integer, floating point and SIMD register space that is coupled to the corresponding functional unit cluster.

According to one scenario, operating system and/or virtual machine monitor (VMM) software assigns specific software threads to a specific processing unit. The shared front end logic 301 and/or operating system/VMM is able to dynamically assign a software thread to a particular processing unit or functional unit set to activate the thread as a hardware thread. In various embodiments, each processing unit includes "context switching" logic (not shown) so that each processing unit can be assigned more software threads than it can simultaneously or concurrently support as hardware threads. That is, the number of software threads assigned to the processing unit can exceed the number of "active" hardware threads the processing unit is capable of presently executing (either simultaneously or concurrently) as evidenced by the presence of context information of a thread within the register space of the processing unit.

Here, for instance, when a software thread becomes actived as a hardware thread, its context information (e.g., the values of its various operands and control information) is located within the register space 321 that is coupled to the functional unit set 303 that is executing the thread's instructions. If a decision is made to transition the thread from an active to inactive state, the context information of the thread is read out of this register space 321 and stored elsewhere (e.g., system memory 323). With the register space of the thread now being "freed up", the context information of another "inactive" software thread whose context information resides, e.g., in system memory 232, can be written into the register space 321. As a consequence, the other thread converts from "inactive" to "active" and its instructions are executed as a hardware thread going forward.

As discussed above, the "room" for the logic circuitry to entertain a large number of hardware threads may come at the expense of maximizing the latency of any particular thread. As such, any of the mechanisms and associated logic circuitry for "speeding-up" a hardware thread's execution may not be present in the shared front end or processing unit circuitry. Such eliminated blocks may include any one or more of: 1) speculation logic (e.g., branch prediction logic); 2) out-of-order execution logic (e.g., register renaming logic and/or a re-order buffer and/or data dependency logic); 3) superscalar logic to dynamically effect parallel instruction issuance for a single hardware thread.

A multi-core processor built with multiple instances of the processing core architecture of FIG. 3 may include any/all of the surrounding features discussed above with respect to FIG. 1.

Figure 4:
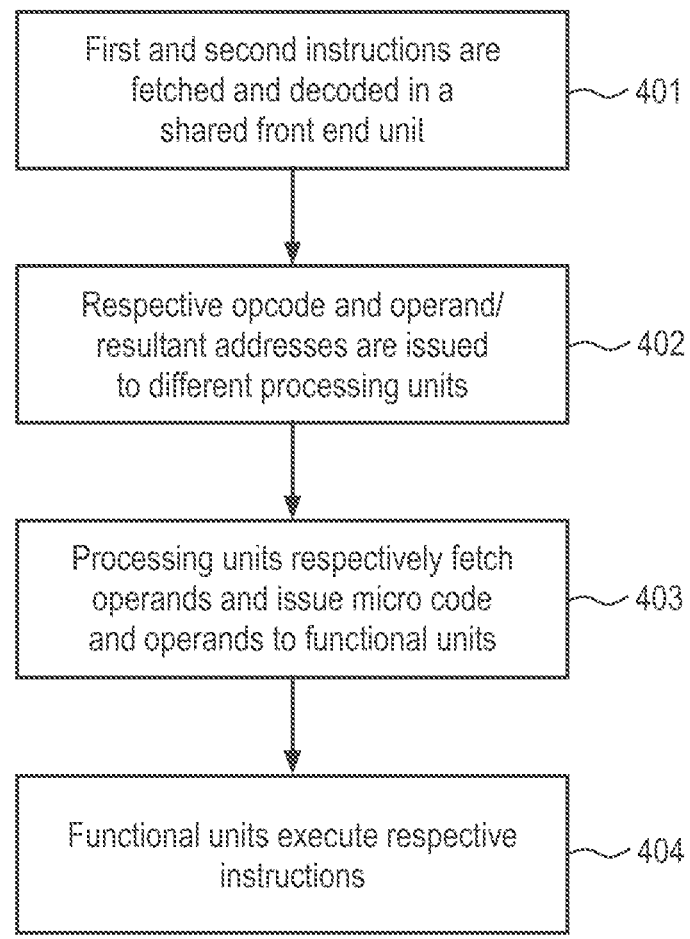
FIG. 4 shows a method performed by the processing core of FIG. 3.

FIG. 4 shows a flow chart describing a methodology of the processing core described above. According to the methodology of FIG. 4, first and second instructions of different hardware threads are fetched 401 and decoded in a shared front-end unit. The instructions are decoded and respective microcode and operand/resultant addresses for the instructions are issued to different processing units from the shared front-end unit 402. The respective processing units fetch data for their respective operands and issue the received microcode and respective operands to respective functional units 403. The functional units then execute their respective instructions 404.

Figure 5:
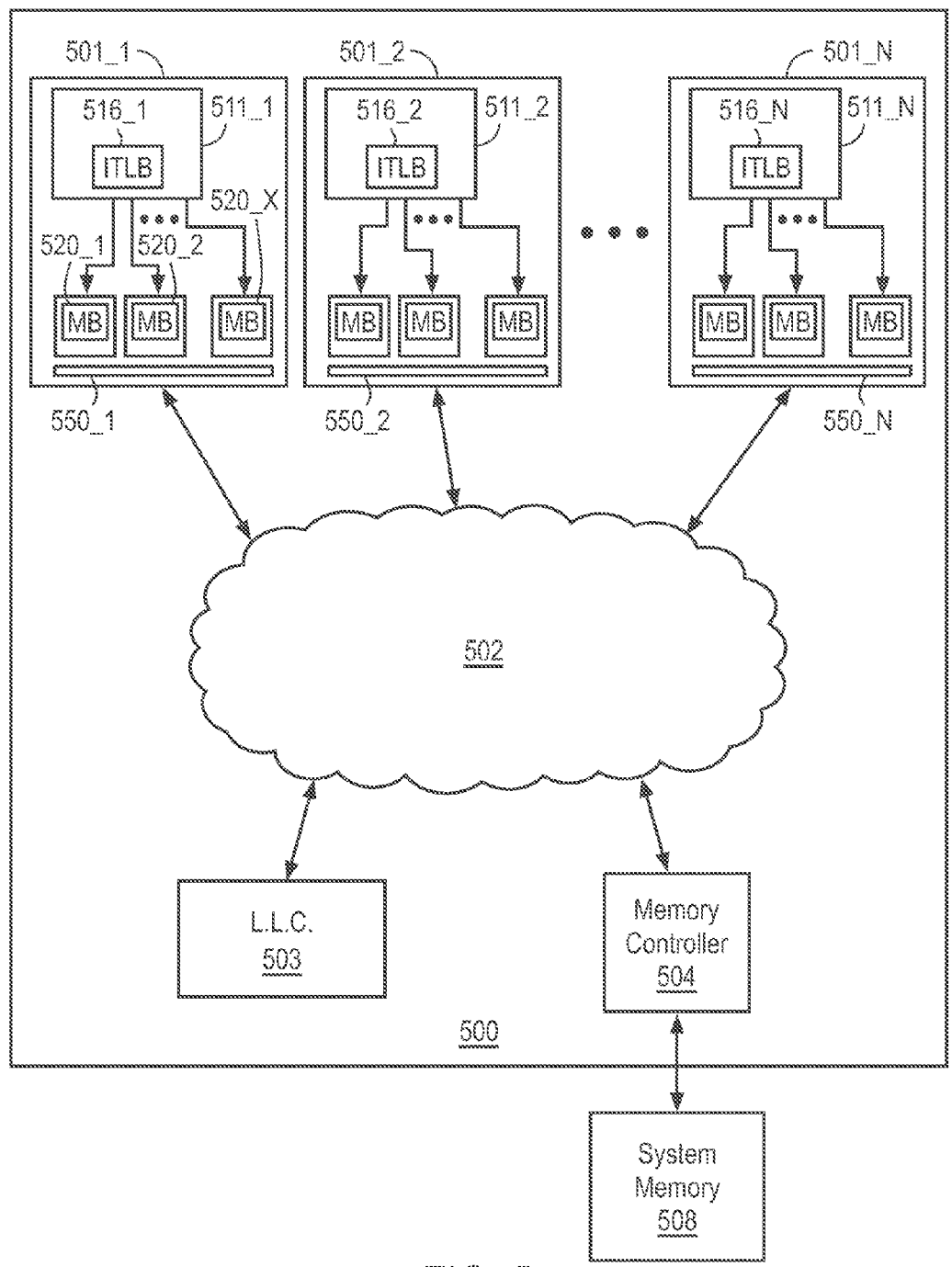
FIG. 5 shows a processor whose respective cores have a shared front end unit.

FIG. 5 shows an embodiment of a processer 500 having multiple processing cores 501_1 through 501_N each having a respective shared front end unit 511_1, 511_2, . . . 511_N (with respective instruction TLB 516_1, 516_2, . . . 516_N) and respective processing units having with corresponding micro-code buffer (e.g., micro-code buffers 520_1, 520_2, etc. within the processing units of core 501_1). Each core also includes one or more caching levels 550_1, 550_2, 550_N to cache instructions and/or data of each processing unit individually and/or a respective core as a whole. The cores 501_1, 501_2, . . . 501_N are coupled to one another through an interconnection network 502 that also couples the cores to one or more caching levels (e.g., last level cache 503) that caches instructions and/or data for the cores 501_1, 501_2 . . . 501_N) and a memory controller 504 that is coupled to, e.g., a "slice" of, system memory 508. Other components such as any of the components of FIG. 1 may also be included in FIG. 5.

Figure 6:
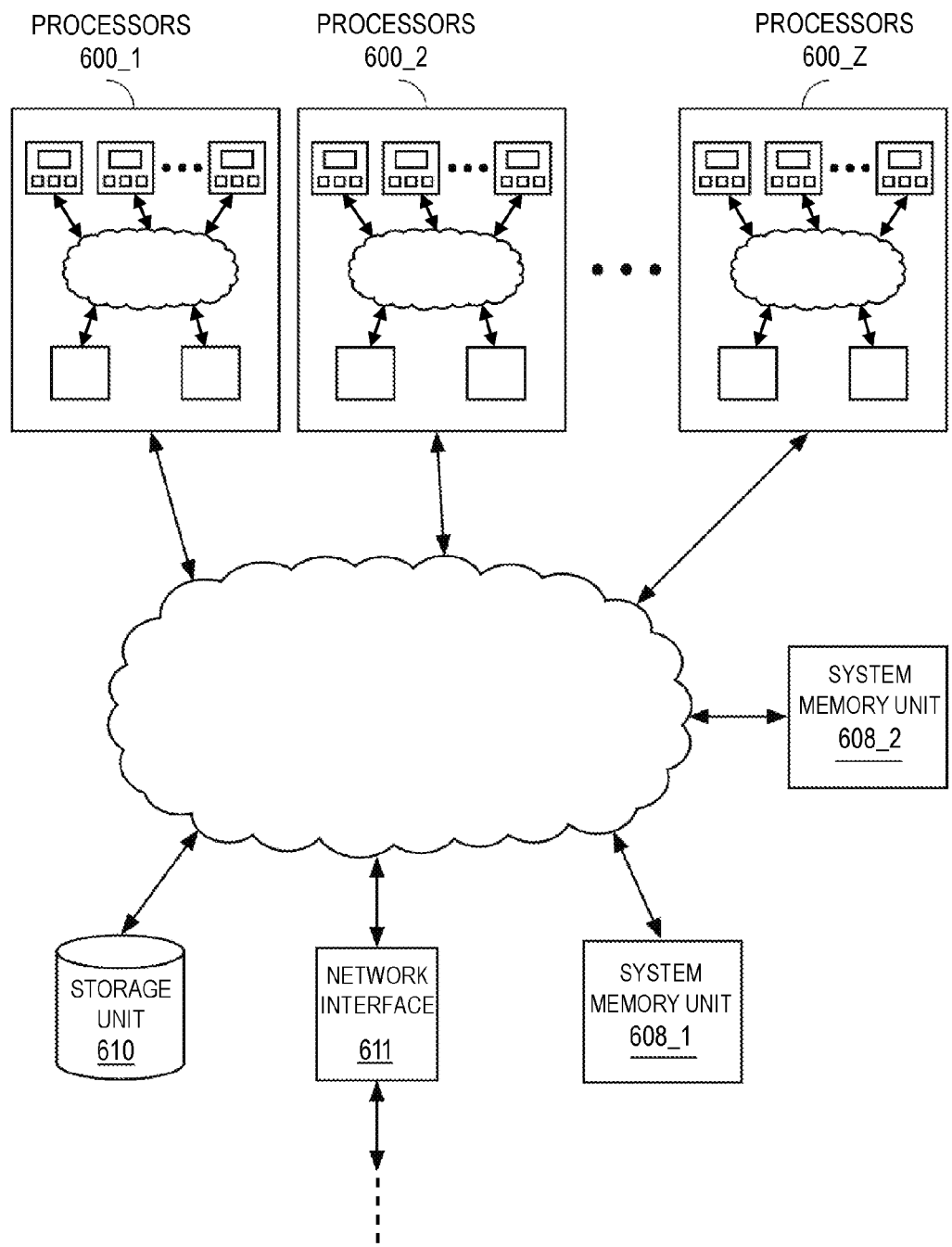
FIG. 6 shows a computing system composed of processors whose respective cores have a shared front end unit.

FIG. 6 shows an embodiment of a computing system, such as a computer, implemented with multiple processors 600_1 through 600_z having the features discussed above in FIG. 5. The multiple processors 600_1 through 600_z are connected to each other through a network that also couples the processors to a plurality of system memory units 608_1, 608_2, a non volatile storage unit 610 (e.g., a disk drive) and an external (e.g., Internet) network interface 611.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A processor having one or more processing cores, each of said one or more processing cores comprising:
   a front end unit to fetch respective instructions of threads and decode said instructions into respective decoded instructions and input operand and resultant addresses of said instructions; and
   a plurality of processing units, each of said processing units to be assigned a plurality of said threads, each processing unit coupled to said front end unit and having a respective buffer to receive and store decoded instructions of its assigned plurality of said threads, each of said plurality of processing units comprising:
   i) a plurality of functional units comprising at least one integer functional unit and at least one floating point functional unit, said plurality of functional units to simultaneously execute its respective processing unit's received, decoded instructions for two or more of its assigned plurality of said threads,
   ii) registers coupled to said plurality of functional units to store operands and resultants of said received, decoded instructions of its assigned plurality of said threads,
   iii) data fetch circuitry to fetch input data operands for said plurality of functional units' execution of said received, decoded instructions of its assigned plurality of said threads, and
   iv) register allocation circuitry to allocate a respective register partition of the registers for each assigned thread of its assigned plurality of said threads.

2. The processor of claim 1 wherein said plurality of functional units are not coupled to any logic circuitry to perform out-of-order execution of said received, decoded instructions.

3. The processor of claim 1 wherein the register allocation circuitry of each of the plurality of processing units is to allocate the respective register partition of the registers for each assigned thread of its assigned plurality of said threads that are to be concurrently executed.

4. The processor of claim 1 wherein said plurality of functional units are not coupled to any logic circuitry to perform speculative execution of said received, decoded instructions.

5. The processor of claim 4 wherein the register allocation circuitry of each of the plurality of processing units is to allocate the respective register partition of the registers for each assigned thread of its assigned plurality of said threads that are to be concurrently executed.

6. The processor of claim 1 wherein said processor does not include circuitry for any of said threads to issue instructions in parallel for any one of said threads.

7. The processor of claim 1 wherein each of the plurality of processing units further comprise register allocation circuitry to allocate a register partition of less than all of the registers for each assigned thread.

8. A method performed by a processor comprising:
   fetching respective instructions of threads with a front end unit of the processor;
   decoding said instructions into respective decoded instructions and input operand and resultant addresses of said instructions with the front end unit of the processor;
   assigning a plurality of said threads to each of a plurality of processing units of a processing core of the processor, each processing unit coupled to said front end unit and having a respective buffer to receive and store decoded instructions of its assigned plurality of said threads;
   simultaneously executing each respective processing unit's received, decoded instructions for two or more of its assigned plurality of threads with a plurality of functional units of each respective processing unit, the plurality of functional units comprising at least one integer functional unit and at least one floating point functional unit;
   storing operands and resultants of said received, decoded instructions of its assigned plurality of said threads in registers coupled to said plurality of functional units;
   fetching input data operands with data fetch circuitry of each respective processing unit for said plurality of functional units' execution of said received, decoded instructions of its assigned plurality of said threads; and
   allocating a respective register partition of the registers, with register allocation circuitry of each processing unit, for each assigned thread of its assigned plurality of said threads.

9. The method of claim 8 further comprising, at each processing unit performing the following:
   allocating the respective register partition of the registers for each assigned thread of its assigned plurality of said threads that are to be concurrently executed.

10. The method of claim 8 wherein software assigns a first thread to a first of the plurality of processing units and a second thread to a second of the plurality of processing units.

11. The method of claim 10 wherein said first and second threads are not processed with any speculative execution logic circuitry.

12. The method of claim 10 wherein said first and second threads are not processed with any out-of-order execution logic circuitry.

13. The method of claim 10 wherein said first and second threads do not issue their respective instructions in parallel.

14. A processor comprising:
   at least two processing cores each having:

a front end unit to fetch respective instructions of threads to be processed by its processing core and decode said instructions into respective decoded instructions and input operand and resultant addresses of said instructions;

said front end unit coupled to a plurality of processing units of its processing core, each of said plurality of processing units to be assigned a plurality of said threads, each processing unit coupled to said front end unit and having a respective buffer to receive and store decoded instructions and each processing unit to receive input operand and resultant addresses of its assigned plurality of said threads from the front end unit, each of said plurality of processing units comprising:

i) a plurality of functional units comprising at least one integer functional unit and at least one floating point functional unit, said plurality of functional units to simultaneously execute its respective processing unit's received, decoded instructions for two or more of its assigned plurality of said threads, ii) registers coupled to said plurality of functional units to store operands and resultants of said received, decoded instructions of its assigned plurality of said threads, iii) data fetch circuitry to fetch input operands for said plurality of functional units' execution of said received, decoded instructions of its assigned plurality of said threads, and iv) register allocation circuitry to allocate a respective register partition of the registers for each assigned thread of its assigned plurality of said threads;

an interconnection network coupled to said plurality of processing units; and a cache coupled to said interconnection network.

15. The processor of claim 14 wherein said plurality of functional units are not coupled to any logic circuitry to perform out-of-order execution of said received, decoded instructions.

16. The processor of claim 15 wherein the register allocation circuitry of each of the plurality of processing units is to allocate the respective register partition of the registers for each assigned thread of its assigned plurality of said threads that are to be concurrently executed.

17. The processor of claim 14 wherein said plurality of functional units are not coupled to any logic circuitry to perform speculative execution of said received, decoded instructions.

18. The processor of claim 17 wherein the register allocation circuitry of each of the plurality of processing units is to allocate the respective register partition of less than all of the registers for each assigned thread of its assigned plurality of said threads that are to be concurrently executed.

19. The processor of claim 14 wherein said processor does not include circuitry for any of said threads to issue instructions in parallel for any one of said threads.

20. The processor of claim 14 wherein each of the plurality of processing units further comprise register allocation circuitry to allocate a register partition of less than all of the registers for each assigned thread.

* * * * *